(12) United States Patent
Kim et al.

(10) Patent No.: US 12,722,123 B2
(45) Date of Patent: Sep. 1, 2026

(54) HOLLOW FIBER MEMBRANE CARTRIDGE

(71) Applicant: KOLON INDUSTRIES, INC., Seoul (KR)

(72) Inventors: Do Woo Kim, Seoul (KR); Na Hyun Ahn, Seoul (KR); In Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 330 days.

(21) Appl. No.: 18/579,895

(22) PCT Filed: Jul. 8, 2022

(86) PCT No.: PCT/KR2022/009919
§ 371 (c)(1),
(2) Date: Jan. 17, 2024

(87) PCT Pub. No.: WO2023/033340
PCT Pub. Date: Mar. 9, 2023

(65) Prior Publication Data
US 2024/0316502 A1 Sep. 26, 2024

(30) Foreign Application Priority Data
Sep. 1, 2021 (KR) ........................ 10-2021-0116568

(51) Int. Cl.
*B01D 63/04* (2006.01)

(52) U.S. Cl.
CPC .......... *B01D 63/04* (2013.01); *B01D 2313/02* (2013.01); *B01D 2313/44* (2013.01)

(58) Field of Classification Search
CPC . B01D 63/04; B01D 2313/02; B01D 2313/44
See application file for complete search history.

(56) References Cited

U.S. PATENT DOCUMENTS

2018/0028979 A1 2/2018 Oh
2021/0178330 A1 6/2021 Ahn

FOREIGN PATENT DOCUMENTS

| | | | |
|---|---|---|---|
| CN | 104785110 | B | 12/2018 |
| JP | S63-097203 | A | 4/1988 |
| JP | 2003-265993 | A | 9/2003 |
| JP | 2010-227837 | A | 10/2010 |
| JP | 2021-521006 | A | 8/2021 |
| KR | 10-1393558 | B1 | 5/2014 |
| KR | 10-2015-0019941 | A | 2/2015 |

(Continued)

OTHER PUBLICATIONS

KR-102186187-B1_English translation (Year: 2018).*
(Continued)

*Primary Examiner* — Youngsul Jeong
(74) *Attorney, Agent, or Firm* — Harvest IP Law, LLP

(57) ABSTRACT

A hollow fiber membrane cartridge according to an aspect of the present invention includes a plurality of hollow fiber membranes and a body portion in which the plurality of hollow fiber membranes are arranged, and above which and below which mesh portions are formed, respectively, wherein the mesh portion includes a plurality of joints and a window formed to be surrounded by the plurality of joints, and a radius of curvature of the joint is 1 to 7 times a diameter of the hollow fiber membrane.

6 Claims, 19 Drawing Sheets

(56) References Cited

FOREIGN PATENT DOCUMENTS

| | | | | | |
|---|---|---|---|---|---|
| KR | 102186187 | B1 | * | 7/2018 | ........ H01M 8/04149 |
| KR | 20180077721 | A | * | 7/2018 | ............ B01D 69/08 |
| KR | 10-2019-0035257 | A | | 4/2019 | |
| KR | 10-2019-0085716 | A | | 7/2019 | |
| KR | 10-2019-0139656 | A | | 12/2019 | |
| KR | 10-2264517 | B1 | | 6/2021 | |
| WO | 2012/043679 | A1 | | 4/2012 | |
| WO | 2013/146821 | A1 | | 10/2013 | |

OTHER PUBLICATIONS

KR-20180077721-A_English translation (Year: 2018).*
EESR dated May 19, 2025.
JP 1st Office Action dated Jan. 7, 2025.
KR Notice Of Allowance dated Jul. 9, 2025.
KR OA dated May 4, 2024.

* cited by examiner

HOLLOW FIBER MEMBRANE CARTRIDGE

CROSS REFERENCE TO RELATED APPLICATION(S)

This application is a National Stage of International Application No. PCT/KR2022/009919 filed on Jul. 8, 2022, claiming priority based on Korean Patent Application No. 10-2021-0116568 filed on Sep. 1, 2021, the disclosure of which is incorporated herein by reference in their entirety.

TECHNICAL FIELD

The present invention relates to a hollow fiber membrane cartridge.

BACKGROUND ART

A fuel cell is a power-generating battery that generates electricity by combining hydrogen and oxygen. Unlike a general chemical cell, such as a battery or a storage battery, a fuel cell can continually generate electricity as long as hydrogen and oxygen are supplied and may have efficiency twice as high as that of an internal combustion engine, without heat loss.

Also, by converting chemical energy generated by the combination of hydrogen and oxygen directly into electrical energy, a fuel cell may emit less pollutants. Accordingly, a fuel cell may not only be environmentally friendly, but may also reduce concerns with respect to resource depletion due to increased energy consumption.

Fuel cells can be largely classified into a polymer electrolyte membrane fuel cell (PEMFC), a phosphoric acid fuel cell (PAFC), a melted carbonate fuel cell (MCFC), solid oxide fuel cell (SOFC), an alkaline fuel cell (AFC), etc. according to electrolyte types that are used.

Each of the fuel cells basically operates according to the same principle but the type of fuel used, the operating speed, catalyst, electrolyte, etc. may be different. Among these fuel cells, the PEMFC, compared to other fuel cells, may operate at a lower temperature and have a higher output density, and thus allowing miniaturization. It is therefore known to be most promising not only for small-sized stationary-type power devices but also for transportation systems.

One of the most important factors for improving the performance of the PEMFC is to maintain the percentage of water content by supplying a predetermined amount of water to a polymer electrolyte membrane (or a proton exchange membrane) (PEM) of a membrane electrode assembly (MEA). This is because when the PEM gets dry, the efficiency of power generation may radically decrease.

Methods of humidifying the PEM include 1) a bubbler humidification method in which water is supplied by filling an internal pressure container with water and an object gas is diffused via a diffuser, 2) a direct injection method in which the amount of water supply required for fuel cell reaction is calculated and water is directly supplied to a gas flow conduit through a solenoid valve, 3) a humidification membrane method in which water is supplied to a gas flow layer by using a polymer separation membrane, etc.

Among these methods, the humidification membrane method in which a PEM is humidified by providing vapor to gas supplied to the PEM by using a membrane selectively transmitting only the vapor included in exhaust gas is advantageous in that a humidifier may be reduced in weight and size.

For the selective transmission membrane used in the humidification membrane method, a hollow fiber membrane having a large transmission area per unit volume for forming a module is desirable. That is, when manufacturing a humidifier by using a hollow fiber membrane, the hollow fiber membrane having a large contact surface is able to be highly integrated, and thus, humidification of a fuel cell may be sufficiently performed even with a small capacity. Also, a less expensive material may be used for the hollow fiber membrane, and water and heat included in unreacted gas discharged from the fuel cell at a high temperature may be retrieved to be re-used through the humidifier.

However, for the humidifier using the hollow fiber membrane, a plurality of hollow fiber membranes may be integrated for increased capacity of the humidifier, and in this case, gas that flows to the outside of the hollow fiber membranes may not be uniformly formed in the entire area of the humidifier due to the resistance caused by the highly integrated hollow fiber membranes.

To overcome this aspect, a hollow fiber membrane module may be realized in the form of a plurality of cartridges, and the plurality of cartridges may be mounted in a membrane humidifier housing for uniform gas flow. That is, a bunch of hollow fiber membranes may be accommodated in each cartridge, and the cartridges may be mounted in the membrane humidifier housing, so that the introduced gas may flow in the cartridges with uniform flow.

However, according to a previous cartridge method, when fluid is introduced or discharged through a window, air flow may shake the hollow fiber membrane, and as the hollow fiber membrane is shaken, the hollow fiber membrane may contact the cartridge window. When such contacts are repeated, the hollow fiber membrane may be damaged (scratched, disconnected, etc.) due to friction caused by the contacts with the window.

DISCLOSURE

Technical Problem

The present invention provides a hollow fiber membrane cartridge capable of minimizing damage to a hollow fiber membrane due to friction with respect to a window.

Technical Solution

A hollow fiber membrane cartridge according to an aspect of the present invention includes a plurality of hollow fiber membranes and a body portion in which the plurality of hollow fiber membranes are arranged, and above which and below which mesh portions are formed, respectively, wherein the mesh portion includes a plurality of joints and a window formed to be surrounded by the plurality of joints, and a radius of curvature of the joint is greater than zero times to five times a diameter of the hollow fiber membrane.

The joint may include a first surface facing an adjacent joint, a second surface crossing the first surface and adjacent to the plurality of hollow fiber membranes, and an edge portion where the first surface and the second surface meet, and a radius of curvature of the edge portion may be greater than zero times to five times the diameter of the hollow fiber membrane.

In the joint, a width of the first surface excluding the edge portion may be greater than zero times to five times the diameter of the hollow fiber membrane.

In the joint, a width of the second surface excluding the edge portion may be greater than zero times to ten times the diameter of the hollow fiber membrane.

In the joint, at least one of a width of the first surface excluding the edge portion and a width of the second surface excluding the edge portion may be 0.

The hollow fiber membrane cartridge may further include a locking portion formed on a side surface of the body portion, wherein the locking portion may include a locking cover formed to be connected to an end of the body portion, and a locking protrusion projecting from another end of the body portion.

The joint may have a first radius of curvature in a first direction parallel with an extension direction of the hollow fiber membrane and a second radius of curvature in a second direction crossing the first direction, the first radius of curvature and the second radius of curvature being different from each other.

The window may have a width that is twice to fifteen times the diameter of the hollow fiber membrane.

A hollow fiber membrane cartridge according to an aspect of the present invention includes a plurality of hollow fiber membranes and a body portion in which the plurality of hollow fiber membranes are arranged, and above which and below which mesh portions are formed, respectively, wherein the mesh portion includes a plurality of joints and a plurality of windows formed to be surrounded by the plurality of joints, and the plurality of windows have one of a circular shape, an elliptical shape, a polygonal shape, a shape of a portion of the circular shape, a shape of a portion of the elliptical shape, or a shape of a portion of the polygonal shape.

The plurality of windows may be arranged side by side.

Advantageous Effects

According to a hollow fiber membrane cartridge according to an aspect of the present invention described above, shapes of a joint and a window of the cartridge may be optimized in order to minimize damage to the hollow fiber membrane due to friction with the joint and the window.

BEST MODE

Figure 1:
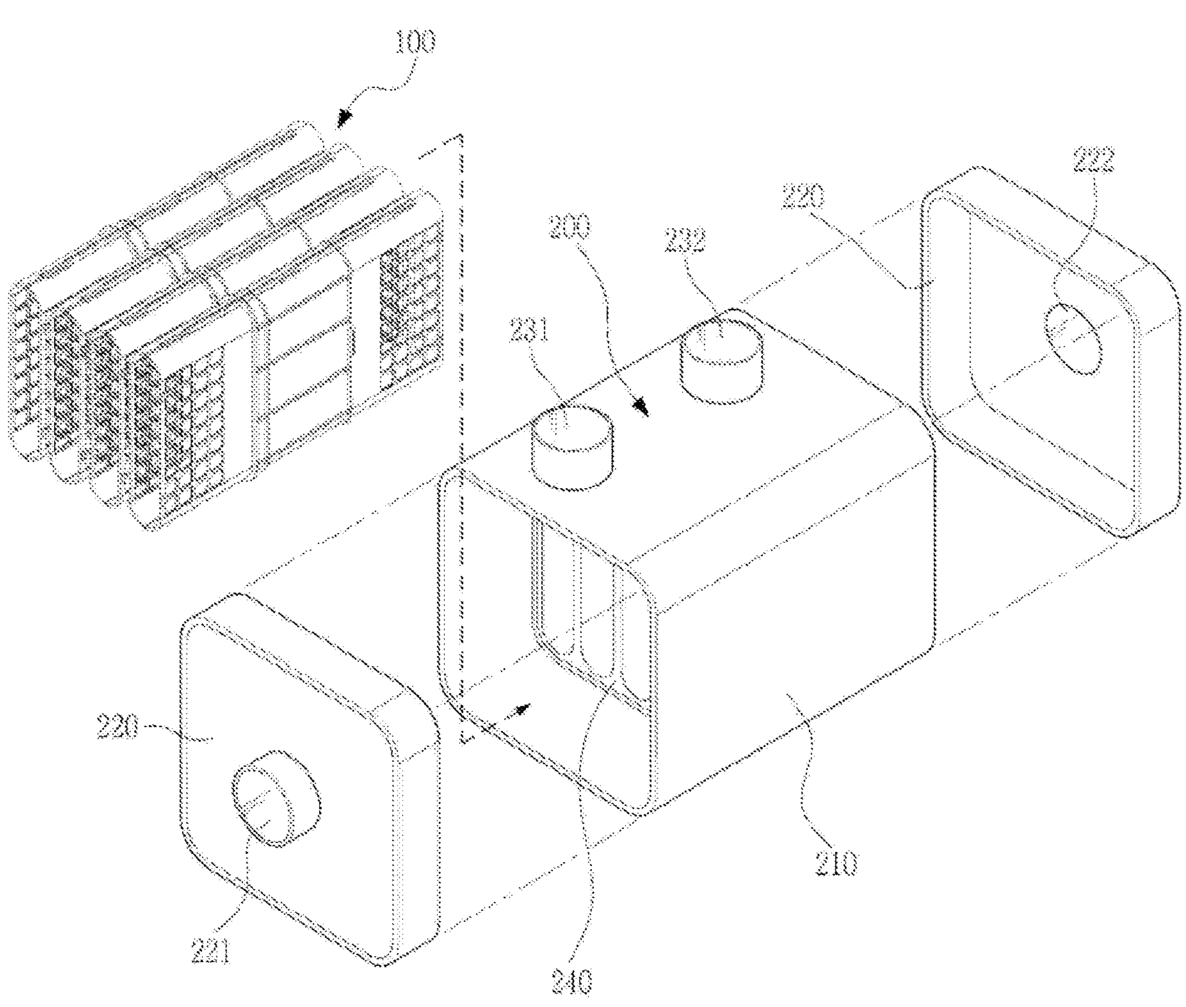
FIG. 1 is an exploded perspective view of a hollow fiber membrane cartridge and a housing portion, according to a first embodiment of the present invention.

Various modifications may be applied to the present invention, and the present invention may have various embodiments, and thus, a predetermined embodiment is shown by way of example in the drawings and will herein be described in detail. However, it shall be understood that the present invention is not limited to the one or more embodiments, and all modifications, equivalents, and substitutes encompassed by the concept and the technical range of the present invention are included in the present invention.

Terms used in the present invention are used only for describing particular embodiments and are not intended to limit the present invention. An expression used in the singular encompasses the expression in the plural, unless it has a clearly different meaning in the context. With respect to the present invention, it will be further understood that the terms "comprises" or "comprising" used herein specify the presence of stated features, integers, steps, operations, members, components, and/or groups thereof, but do not preclude the presence or addition of one or more other features, integers, steps, operations, members, components, and/or groups thereof.

Hereinafter, desirable embodiments of the present invention are described in detail with reference to the accompanying drawings. Here, it shall be noted that the same elements in the accompanying drawings are indicated by the same reference signs as possible. Also, detailed descriptions about the well-known functions and elements which may blur the gist of the present invention are omitted. Based on the same reason, some elements are exaggerated, omitted, or schematically illustrated in the accompanying drawings.

Hereinafter, a hollow fiber membrane cartridge 100 according to a first embodiment of the present invention is described.

Figure 2:
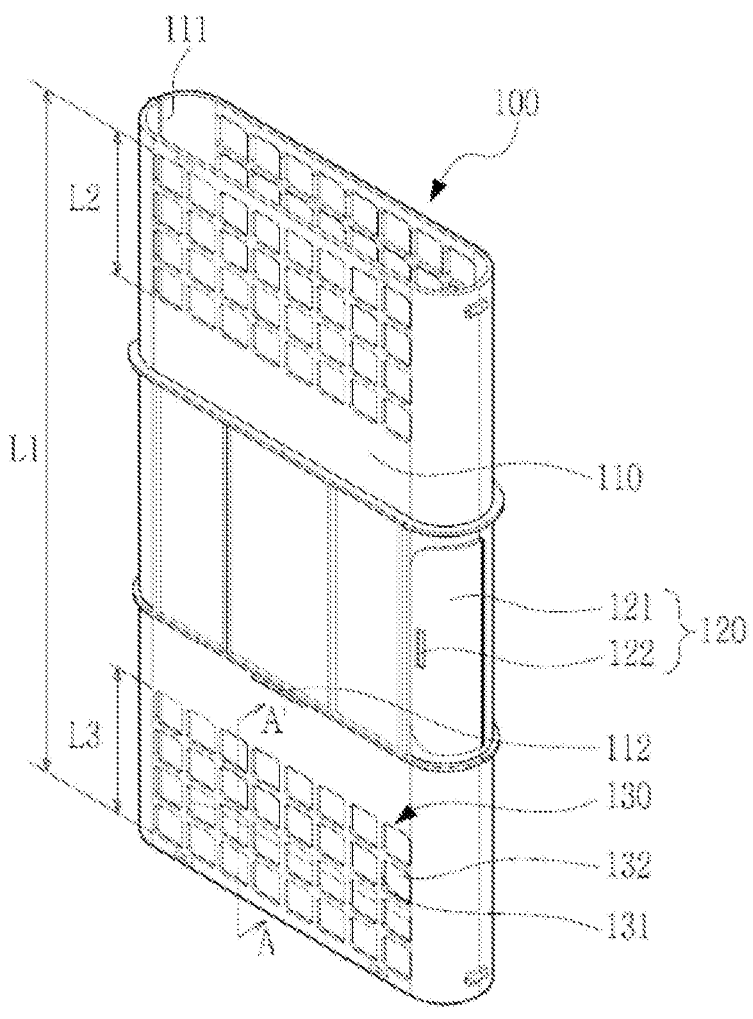
FIG. 2 is a perspective view of the hollow fiber membrane cartridge of FIG. 1.
Figure 3:
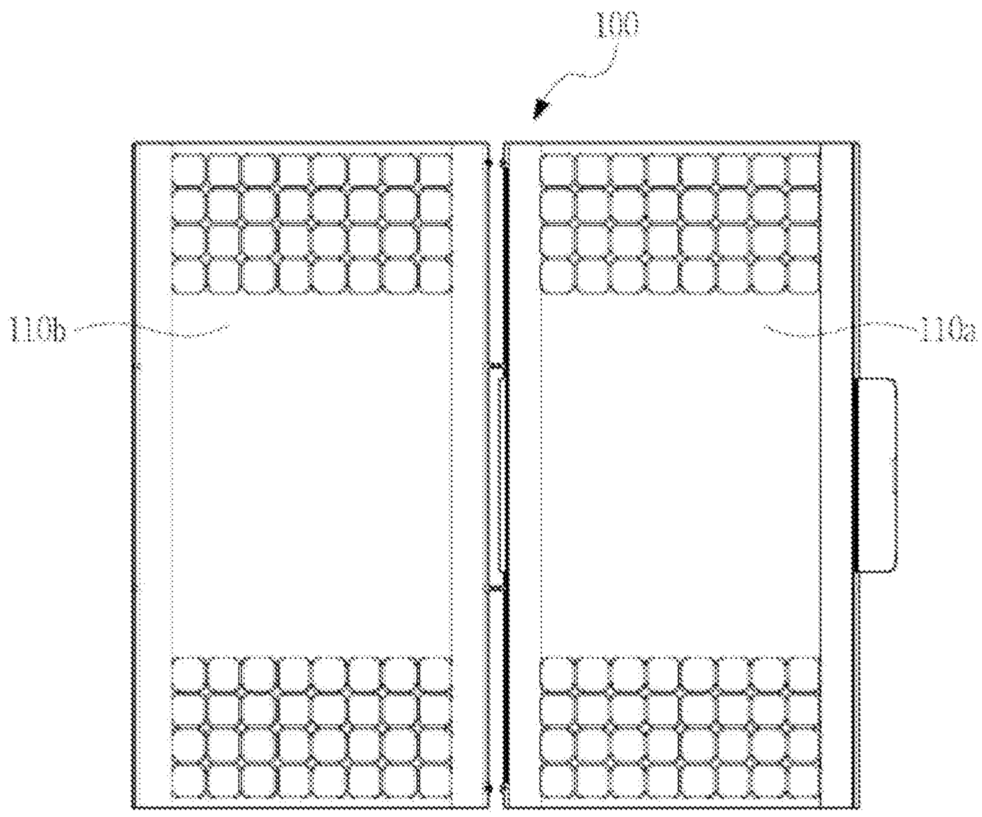
FIG. 3 is a plan view illustrating an open state (unfolded state) of the hollow fiber membrane cartridge of FIG. 2.
Figure 4:
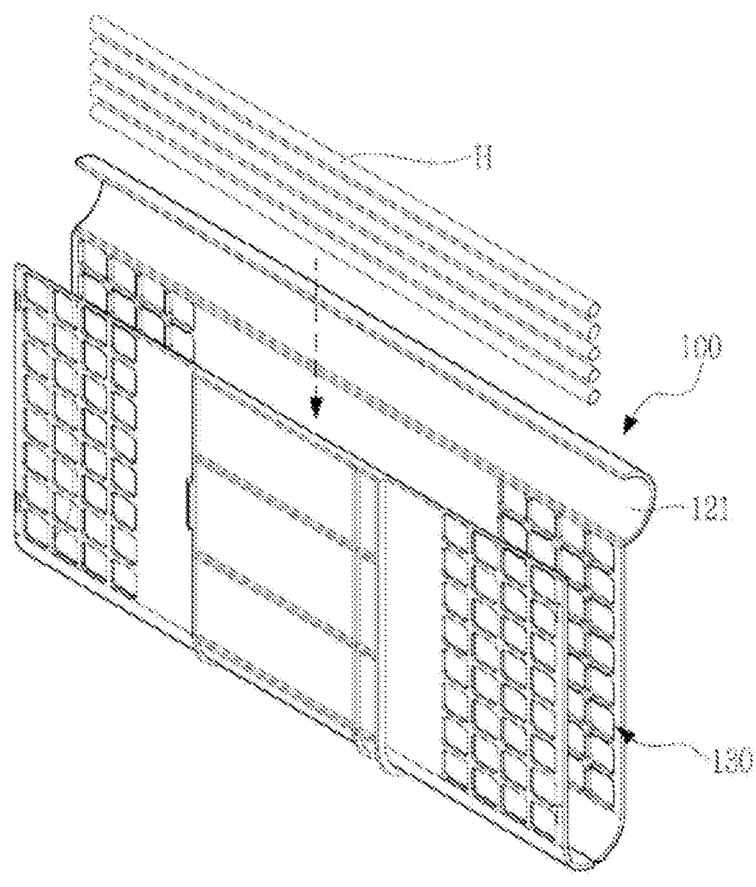
FIG. 4 is a view illustrating a state in which a hollow fiber membrane is inserted into the open hollow fiber membrane cartridge of FIG. 2.

FIG. 1 is an exploded perspective view of a hollow fiber membrane cartridge according to a first embodiment of the present invention, FIG. 2 is a perspective view of the hollow fiber membrane cartridge of FIG. 1, FIG. 3 is a plan view of the hollow fiber membrane cartridge of FIG. 2 in an open state (an unfolded state), and FIG. 4 is a view showing a state in which a hollow fiber membrane is inserted into the open hollow fiber membrane cartridge of FIG. 2.

Referring to FIGS. 1 to 4, the hollow fiber membrane cartridge 100 according to the first embodiment of the present invention may be mounted in a housing portion 200, and a plurality of hollow fiber membranes H may be accommodated in the hollow fiber membrane cartridge 100. In the hollow fiber membrane cartridge 100 according to the first embodiment of the present invention, an edge portion 131*c* of a joint 131 may have a predetermined radius of curvature R, and thus, pressure of fluid introduced through a window 132 may be reduced, so as to reduce damage to the hollow fiber membranes H.

Before describing the hollow fiber membrane cartridge 100 according to the first embodiment of the present invention, the housing portion 200 in which the hollow fiber membrane cartridge 100 is mounted is to be described first.

The housing portion 200 may be an exterior case accommodating the hollow fiber membrane cartridge 100. The housing portion 200 may include a housing body 210 and housing caps 220 or may include the housing body 210 and the housing caps 220 integrally combined with each other. The housing body 210 and the housing caps 220 may include hard plastic or metal, such as polycarbonate.

Also, the housing body 210 and the housing caps 220 may have polygonal or circular cross-sectional shapes in a width direction. The polygonal shapes may include a quadrangular shape, a square shape, a trapezoid shape, a parallelogram shape, a pentagonal shape, a hexagonal shape, etc., and the polygonal shapes may have round edges. Also, the circular shape may include an oval shape.

A first fluid inlet 231 through which a first fluid is supplied and a first fluid outlet 232 through which the first fluid is discharged may be formed at both ends of the housing body 210, respectively.

A plurality of hollow fiber membrane cartridges 100 in which a plurality of hollow fiber membranes H selectively transmitting water are accommodated, may be arranged in the housing portion 200. Here, materials of the hollow fiber membranes H are well known, and thus, their detailed descriptions are omitted in this specification.

A potting portion (not shown) fastening the hollow fiber membranes and filling a gap between the hollow fiber membranes H may be formed at both ends of the hollow fiber membrane cartridge 100. Thus, the potting portion may block both ends of the hollow fiber membrane cartridge 100, and thus, a fluid passage through which the first fluid passes may be formed in the hollow fiber membrane cartridge 100. Materials of the potting portion are well known, and thus, their detailed descriptions are omitted in this specification.

The housing caps 220 may be coupled to both ends of the housing body 210. A second fluid inlet 221 and a second fluid outlet 222 may be formed at the housing caps 220, respectively. A second fluid introduced through the second fluid inlet 221 of the housing cap 220 at one side may be introduced into the cartridge, may pass through an internal pipe of the hollow fiber membrane to be discharged to the outside of the cartridge, and then, may be spilt outside through the second fluid outlet 222 of the housing cap at the other side.

A plurality of insertion holes 240 to mount the hollow fiber membrane cartridge 100 may be formed in the housing portion 200, and the hollow fiber membrane cartridge 100 may be inserted into each of the insertion holes 240. Here, a projecting protrusion of a separation prevention hook 112 formed in the hollow fiber membrane cartridge 100 may project at an end of the insertion hole 240, and thus, the hollow fiber membrane cartridge 100 may be completely mounted. Also, reverse withdrawal of the hollow fiber membrane cartridge 100 may be prevented by the projecting protrusion of the separation prevention hook 112, and thus, the hollow fiber membrane cartridge 100 mounted in the insertion hole 240 may be prevented from being detached in a reverse direction. However, a coupling method of the housing portion 200 and the hollow fiber membrane cartridge 100 is not necessarily limited thereto and may be modified within a range which may be implemented by one of ordinary skill in the art.

When the hollow fiber membrane cartridge 100 is to be withdrawn from the insertion hole 240 for repairing, cleansing, etc., the hollow fiber membrane cartridge 100 may be withdrawn by pushing the hollow fiber membrane cartridge 100 in an opposite direction to an insertion direction, while strongly pressing the projecting protrusion. Furthermore, various methods may be used for inserting or withdrawing the hollow fiber membrane cartridge 100.

Next, a water exchange process of the second fluid and the first fluid is described. In the description below, the second fluid may be a low moisture fluid, and the first fluid may be a high moisture fluid. Alternatively, the first fluid may be a low moisture fluid, and the second fluid may be a high moisture fluid.

The second fluid may be supplied into the housing portion 200 and the hollow fiber membrane cartridge 100 through the second fluid inlet 221 of the housing cap 220 at one side and may flow into the hollow fiber membranes to be discharged to the outside through the second fluid outlet 222 of the housing cap 220 at the other side. The second fluid may also flow in a direction in which the second fluid may be introduced through the second fluid outlet 222 and discharged through the second fluid inlet 221.

The first fluid may be supplied to the housing body 210 through the first fluid inlet 231 of the housing body 210, and then, may flow to the outside of the hollow fiber membranes through the mesh portion 130 of the hollow fiber membrane cartridge 100 to be discharged to the housing body 210 through the mesh portion 130 of the hollow fiber membrane cartridge 100, and thereafter, may be discharged to the outside through the first fluid outlet 232 of the housing body 210.

The first fluid may also flow in a direction such that the first fluid may be introduced through the first fluid outlet 232 and may be discharged through the first fluid inlet 231. That is, the second fluid and the first fluid may flow in opposite directions to each or may flow in the same direction as each other.

Each of the second fluid and the first fluid may flow inside and outside the hollow fiber membrane H and may exchange a substance such as moisture, heat, or the like through the hollow fiber membrane H.

The hollow fiber membrane cartridge 100 according to the first embodiment of the present invention is described in detail. The plurality of hollow fiber membrane cartridges 100 may be arranged in the housing portion 200, and the hollow fiber membranes H may be accommodated in the hollow fiber membrane cartridges 100. The hollow fiber membrane cartridge 100 may include the hollow fiber membranes H, a body portion 110, and a locking portion 120. Here, it may be understood by one of ordinary skill in the art that other general-purpose components in addition to the components illustrated in FIGS. 1 to 4 may further be included in the hollow fiber membrane cartridge 100.

The plurality of hollow fiber membranes H may be arranged in the body portion 110, and a mesh portion 130 may be formed at each of an upper portion and a lower portion of the body portion 110. The body portion 110 may have a cuboid shape having rounded both side surfaces, a cylindrical shape having a circular cross-section, or an elliptical cylindrical shape having an elliptical cross-section. The body portion 110 may desirably include a material having good dimensional stability, good resin flow, and high durability against thermal deformation. Examples of such a material may include acrylonitrile-butadiene-styrene (ABS) resin, nylon, etc.

The body portion 110 may include a folding portion 111 configured to unfold the cartridge 100 when a locking state by the locking portion 120 is dismissed. The folding portion 111 may include a V-shaped groove or a U-shaped groove formed in the body portion 110. The body portion 110 may be divided into a right body portion **110*a* and a left body portion 110*b* by the folding portion 111. The body portion 110 may include the separation prevention hook 112 configured to prevent detachment of the cartridge 100 from the housing portion 200 when the cartridge 100 is inserted into the housing portion 200. The separation prevention hook 112 may be formed on at least one of an upper surface or a lower surface of the body portion 110** as a protrusion projecting in a predetermined length.

The locking portion 120 may be formed on a side surface of the body portion 110. The locking portion 120 may include a locking cover 121 formed to be connected with an end of the body portion 110 in an unfolded state and a locking protrusion 122 protruding from the other end of the body portion 110. The locking portion 120 is not limited thereto, and the locking portion 120 may include a locking protrusion (not shown) formed on the locking cover 121, and the body portion 110 may include a locking groove (not shown) into which the locking protrusion is inserted.

As illustrated in FIG. 4, the locking portion 120 may be realized to open an entire side surface of the body portion 110. In this case, the locking portion 120 may include the locking cover 121 having a curved shape and opening and closing the entire side surface of the body portion 110 and the locking protrusion 122 protruding from the body portion 110. In this case, the body portion 110 may not have to include the folding portion 111, and thus, the durability of the cartridge 100 may be improved.

Although not shown, the locking portion 120 may be realized to slide on a side of the body portion 110. In this case, the locking portion 120 may include a locking cover having a curved shape and vertically sliding on a side of the body portion 110 to open or close the side of the body portion 110 and a sliding groove (not shown) formed on a side of the body portion, into which the locking cover may slide. Also in this case, the body portion 110 may not have to include the folding portion 111, and thus, the durability of the cartridge 100 may be improved. However, the shape and the structure of the locking portion 120 are not necessarily limited thereto and may be changed within a range which may be implemented by one of ordinary skill in the art.

The mesh portion 130 may include a joint 131 and a window 132. The mesh portion 130 may be formed at each of an upper portion and a lower portion of the body portion 110. The mesh portion 130 may introduce the first fluid that is led through the first fluid inlet 231 and is highly moist into the cartridge 100 through the window 132, so that moisture is exchanged between the first fluid and the second fluid that is led through the second fluid inlet 231 and is dry. The mesh portion 130 may prevent direct collision between a portion of the introduced first fluid and the hollow fiber membrane arranged in the cartridge 100 so as to prevent damage to the hollow fiber membrane.

A length L2+L3 of the mesh portion 130 may be 10 to 70% of the entire length L1 of the cartridge, and the entire area of the window 132 surrounded by the joint 131 may be 30 to 70% of the entire area of the cartridge. When the entire area of the window 132 exceeds 70%, a space through which the first fluid that is introduced through the first fluid inlet 231 and is highly moist may transmit moisture through the hollow fiber membrane may be reduced, and thus, general humidification efficiency may be degraded.

According to the related art, to prevent disconnection of the hollow fiber membrane, an additional mesh network is required. However, according to the cartridge 100 according to the present invention, the mesh portion 130 may be provided to prevent the disconnection of the hollow fiber membrane, and thus, an additional mesh network may not be needed.

Figure 5:
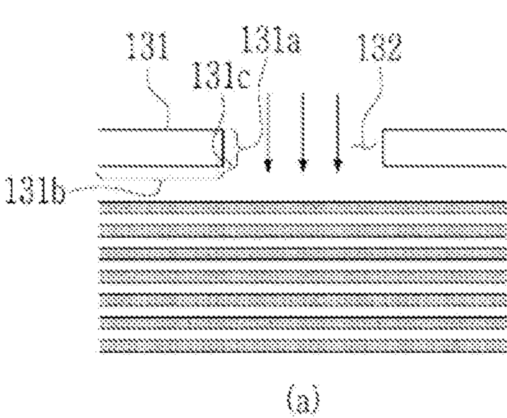
FIG. 5 is a view illustrating a flow direction of fluid introduced through a mesh portion according to a shape of a joint.
Figure 5:
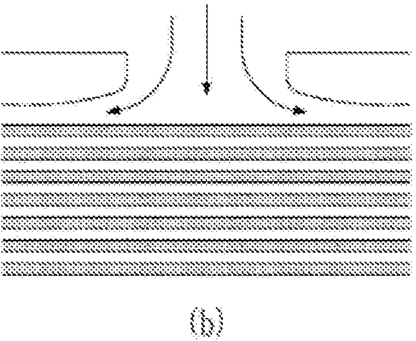
Figure 6:
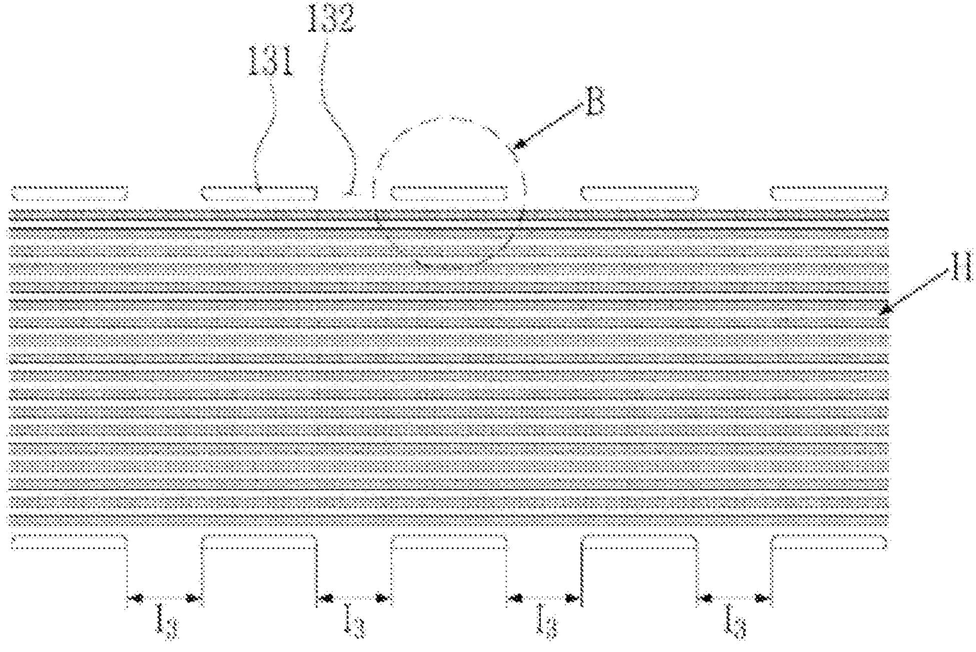
FIG. 6 is a view taken along a line A-A' of FIG. 2.
Figure 7:
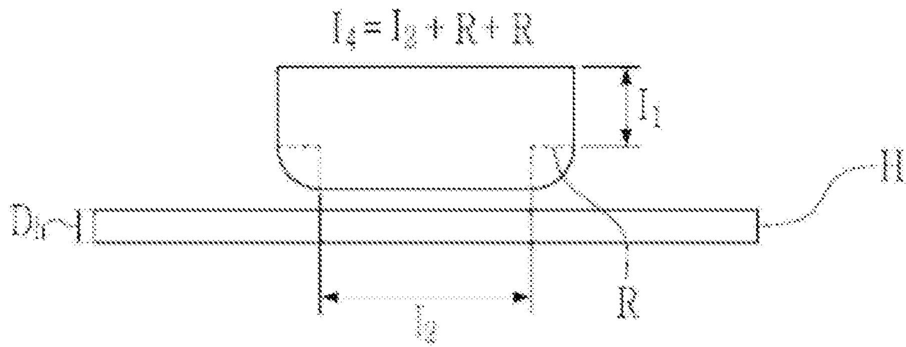
FIG. 7 is an enlarged view of a region B of FIG. 6.

FIG. 5 illustrates a flow direction of fluid introduced through a mesh portion according to a shape of a joint, FIG. 6 is a view taken along a line A-A' of FIG. 2, and FIG. 7 is an enlarged view of a region B of FIG. 6.

Referring to FIGS. 5 to 7, the joint 131 may function as a plurality of frames surrounding the window 132 in the mesh portion 130. The joint 131 may include a first surface 131*a* facing an adjacent joint, a second surface 131*b* crossing the first surface 131*a* and adjacent to the plurality of hollow fiber membranes H, and an edge portion 131*c* located where the first surface 131*a* and the second surface 131*b* meet. A radius of curvature R of the joint 131 may be 1 to 7 times, desirably, 1 to 5 times a diameter Dh of the hollow fiber membrane. More desirably, the radius of curvature R of the joint 131 may be greater than 0 times the diameter Dh of the hollow fiber membrane to 5 times the diameter Dh of the hollow fiber membrane. Here, the radius of curvature R of the joint 131 may denote a radius of curvature R of any one edge including the edge portion 131*c* of the joint 131. The radius of curvature R of the edge portion 131*c* may be 1 to 7 times, desirably, 1 to 5 times the diameter Dh of the hollow fiber membrane. More desirably, the radius of curvature R of the edge portion 131*c* may be greater than 0 times the diameter Dh of the hollow fiber membrane to 5 times the diameter Dh of the hollow fiber membrane.

When the edge portion 131*c* of the joint 131 does not have a curve as shown in (a) of FIG. 5, the first fluid introduced through the window 132 may be introduced in a direction perpendicular to an extension direction of the hollow fiber membrane H. Here, flow of the fluid may shake the hollow fiber membrane H, and as the hollow fiber membrane H is shaken, the hollow fiber membrane H may come into contact with the joint 131 of the mesh portion 130. When this state continues, the hollow fiber membrane H may be damaged (scratched, disconnected, etc.) due to friction with the joint 131.

When the edge portion 131*c* of the joint 131 has a curve as shown in (b) of FIG. 5, a portion of the first fluid introduced through the window 132 may be led along the curve of the edge portion 131*c*. Damage to the hollow fiber membrane H directly below the joint 131 may be prevented more effectively when the first fluid is obliquely introduced as illustrated in (b) of FIG. 5 than when the first fluid is introduced in the direction perpendicular to the extension direction of the hollow fiber membrane H as illustrated in (a) of FIG. 5. Here, according to the curvature of the edge portion 131*c*, the degree of damage to the hollow fiber membrane H may vary. When the radius of curvature R of the edge portion 131*c* is 1 to 7 times the diameter Dh of the hollow fiber membrane, manufacturing of the mesh portion 130 may not be affected, and the degree of damage to the hollow fiber membrane H may be reduced.

A first width I1 of the joint 131, that is, a width of the first surface 131*a* except the edge portion 131*c*, may be 1 to 5 times the diameter Dh of the hollow fiber membrane. More desirably, the first width I1, which is the width of the first surface 131*a* of the joint 131, may be greater than 0 times to 5 times the diameter Dh of the hollow fiber membrane. The edge portion 131*c* and the first width I1 of the joint 131 may lead a path through which the first fluid introduced through the window 132 is flown. Thus, by adjusting the first width I1, the flow of the first fluid introduced through the window 132 may be adjusted.

A second width I2 of the joint 131, that is, a width of the second surface 131*b* except the edge portion 131*c*, may be 1 to 10 times the diameter Dh of the hollow fiber membrane. More desirably, the second diameter I2, which is the width of the second surface 131*b* of the joint 131, may be greater than 0 times to 10 times the diameter Dh of the hollow fiber membrane. When the second width I2 is small, a contact area between the hollow fiber membrane H and the joint 131 may be reduced, and thus, pressure applied to the hollow fiber membrane H may be increased. When the second width I2 is large, a width of the window 132 may be reduced accordingly, and thus, pressure of the first fluid introduced through the window 132 may be increased. When the second width I2 is 1 to 10 times the diameter Dh of the hollow fiber membrane, a contact area between the hollow fiber membrane H and the joint 131 may be increased and the pressure of the first fluid introduced through the window 132 may be reduced, and thus, the degree of damage to the hollow fiber membrane H may be decreased.

A joint width 14 may be a value obtained by adding two times the radius of curvature R to the second width I2 and may be determined by the second width 14 that is determined and the radius of curvature R.

The window 132 may be formed to be surrounded by the plurality of joints 131 and may serve as a passage through which the first fluid is introduced. The window 132 may have a quadrangular hole-shape formed in the mesh portion 130. The joint 131 surrounding the window 132 may function as a stopper limiting movement of the hollow fiber membrane H, when the hollow fiber membrane H is shaken by the introduction of the first fluid.

Thus, when a width 13 of the window 132 is large, a distance between the joints 131 functioning as the stopper may be increased, and the displacement of the hollow fiber membrane H may be increased, which may cause damage to the hollow fiber membrane H. When the width 13 of the window 132 is small, pressure of the first fluid introduced through the window 132 may be increased, which may cause damage to the hollow fiber membrane H. Accordingly, when the window 132 has a width that is 2 to 15 times, desirably, 2 to 10 times the diameter Dh of the hollow fiber membrane Dh, the displacement of the hollow fiber membrane H may be limited, and at the same time, the pressure of the first fluid may be appropriately maintained, and thus, the damage to the hollow fiber membrane H may be prevented.

Hereinafter, the hollow fiber membrane cartridge 100 according to a second embodiment of the present invention is described.

Figure 8:
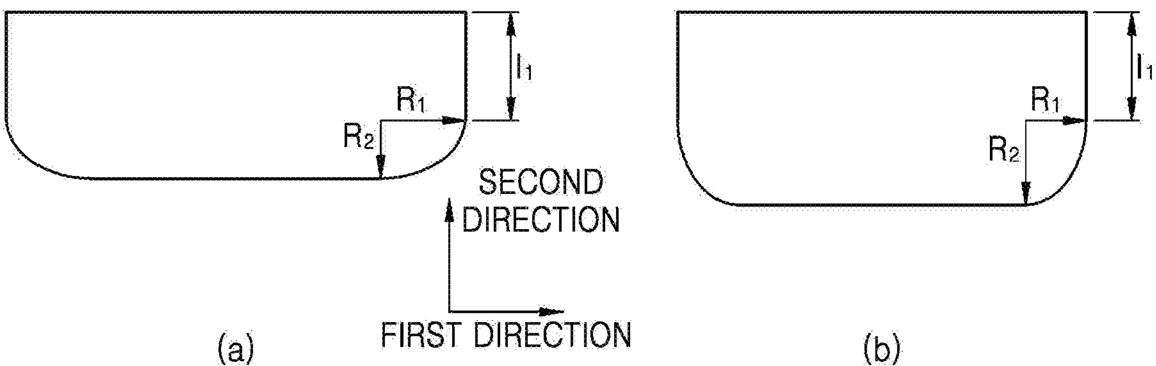
FIG. 8 is a cross-sectional view of a joint according to a second embodiment of the present invention.

FIG. 8 is a cross-sectional view of a joint according to the second embodiment of the present invention.

Referring to FIG. 8, the hollow fiber membrane cartridge 100 according to the present second embodiment may have the same structure as the hollow fiber membrane cartridge 100 according to the first embodiment, except for the shape of the joint 131, and thus, the same configurations are not repeatedly described.

According to the present embodiment, the joint 131 may have a first radius of curvature R1 in a first direction parallel with an extension direction of the hollow fiber membrane H and a second radius of curvature R2 in a second direction crossing the first direction, the first radius of curvature R1 and the second radius of curvature R2 being different from each other.

As illustrated in (a) of FIG. 8, when the first radius of curvature R1 is greater than the second radius of curvature R2, an introduction path of the first fluid introduced through the window 132 may be radically changed according to a curve. As illustrated in (b) of FIG. 8, when the second radius of curvature R2 is greater than the first radius of curvature R1, an introduction path of the first fluid introduced through the window 132 may be smoothly changed according to a curve. The introduction path of the first fluid introduced through the window 132 may be changed according to a ratio between the first radius of curvature R1 and the second radius of curvature R2, and thus, the first radius of curvature R1 and the second radius of curvature R2 may be changed such that the first fluid is introduced through the introduction path which may minimize damage to the hollow fiber membrane H.

Hereinafter, the hollow fiber membrane cartridge 100 according to a third embodiment of the present invention is described.

Figure 9:
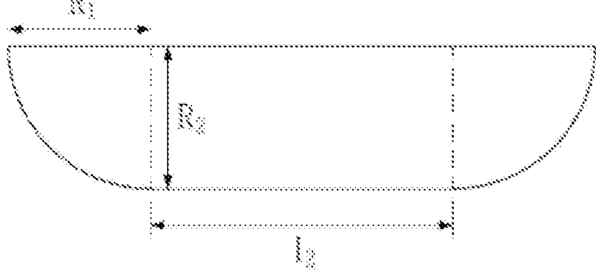
FIG. 9 is a cross-sectional view of a joint according to a third embodiment of the present invention.
Figure 10:
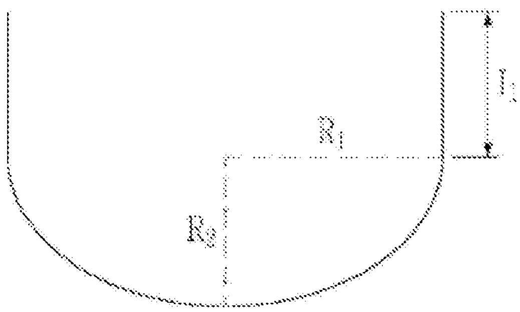
FIG. 10 illustrates a modified example of a cross-section of the joint according to the third embodiment of the present invention.

FIG. 9 is a cross-sectional view of a joint according to the third embodiment of the present invention, and FIG. 10 is a modified example of a cross-section of the joint according to the third embodiment of the present invention.

Referring to FIGS. 9 and 10, the hollow fiber membrane cartridge 100 according to the present third embodiment may have the same structure as the hollow fiber membrane cartridge 100 according to the first embodiment, except for the shape of the joint 131, and thus, the same configurations are not repeatedly described.

At least one of a width of the first surface 131*a* of the joint 131 except the edge portion 131*c* and a width of the second surface 131*b* of the joint 131 except the edge portion 131*c* may be 0. When the first width I1, which is the width of the first surface 131*a* except the edge portion 131*c*, is 0 as illustrated in FIG. 9, an introduction path of the first fluid introduced through the window 132 may be relatively more radically changed according to a curve, compared to when the first width I1 is not 0. In this case, the first fluid may be prevented from being introduced in a direction perpendicular to an extension direction of the hollow fiber membrane H, and at the same time, a contact area between the hollow fiber membrane H and the joint 131 may be increased by adjusting the second width I2, and thus, damage to the hollow fiber membrane H due to displacement may be prevented.

When the second width I2, which is the width of the second surface 131*b* except the edge portion 131*c*, is 0 as illustrated in FIG. 10, the first width I1 may generate a distance between an entrance of the window 132 through which the first fluid is introduced and the hollow fiber membrane H, and thus, pressure of the first fluid may be decreased. Also, when the second width I2 is 0, a width of the window 132 may be accordingly increased, and thus, pressure applied through the window 132 may be reduced. The pressure of the first fluid may be reduced, and thus, the displacement of the hollow fiber membrane H may be reduced. Accordingly, damage to the hollow fiber membrane H may be prevented.

Figure 11:
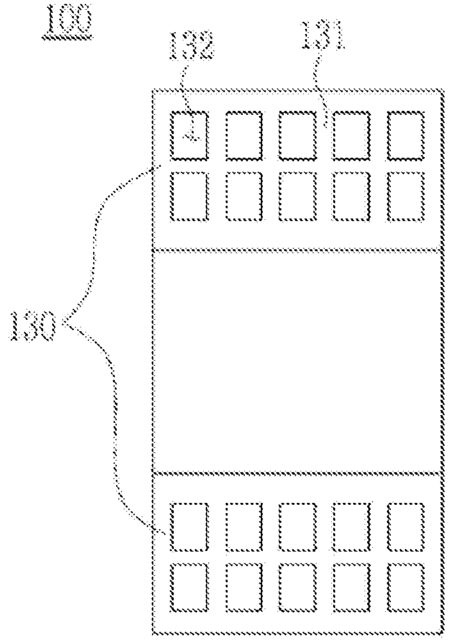
FIG. 11 is a view schematically illustrating a shape of a window according to the first embodiment of the present invention.

FIG. 11 is a view schematically illustrating a shape of a window according to the first embodiment of the present invention, and FIGS. 12 to 16 are modified examples according to the first embodiment of the present invention.

Figure 16:
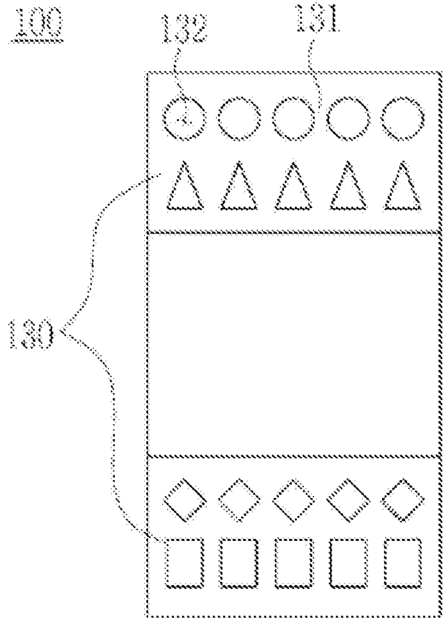
Figure 17:
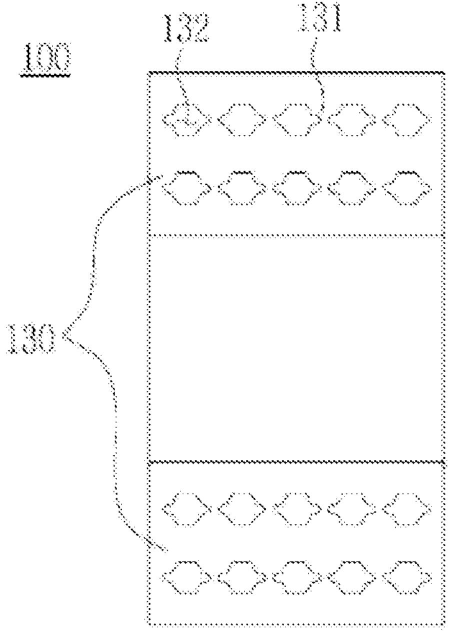
FIGS. 17 to 19 illustrate yet other modified examples according to the first embodiment of the present invention.
Figure 18:
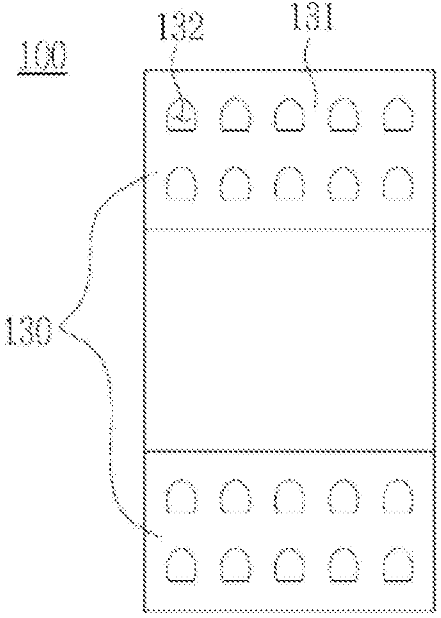
Figure 19:
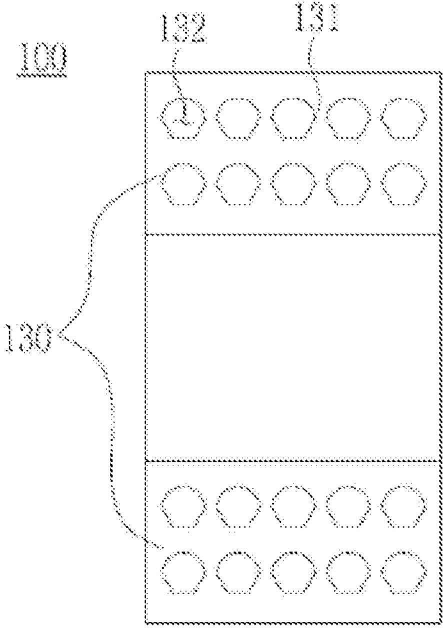

FIGS. 17 to 19 are yet other modified examples according to the first embodiment of the present invention. Referring to FIGS. 11 to 16, the window 132 may be arranged in plural above and below the body portion 110 and may have a polygonal shape, a circular shape, an elliptical shape, or a combination of the polygonal shape, the oval shape, and the elliptical shape. When a width of the window 132 is increased, pressure of the first fluid introduced through the window 132 may be decreased to prevent damage to the hollow fiber membrane H. However, at the same time, a distance between the joints 131 surrounding the window 132, the joints 131 functioning as the stopper limiting the displacement of the hollow fiber membrane H, may be increased, to cause damage to the hollow fiber membrane H. Thus, the width and the shape of the window 132 may have to be appropriately changed according to the flow and the direction of the introduced first fluid.

Figure 12:
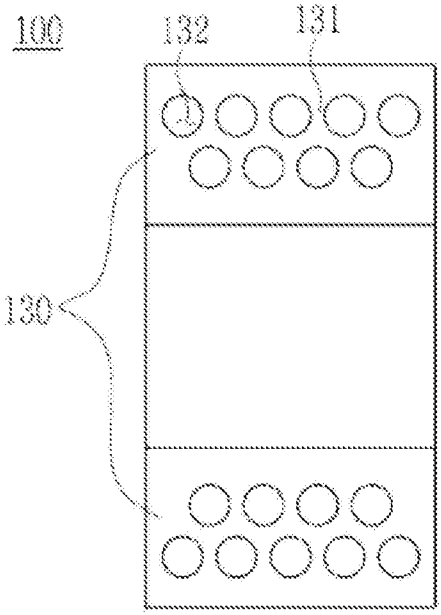
FIGS. 12 to 16 illustrate modified examples according to the first embodiment of the present invention.
Figure 13:
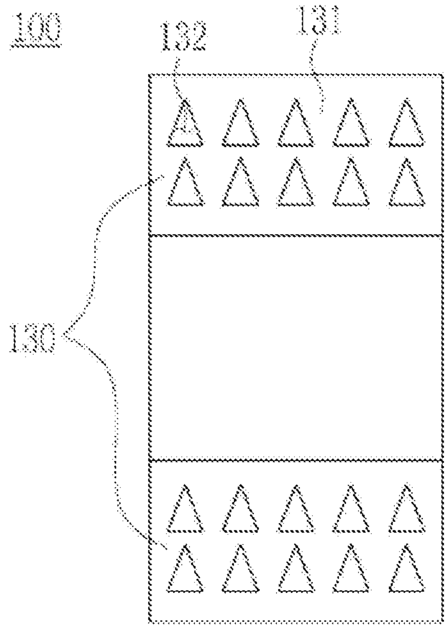
Figure 14:
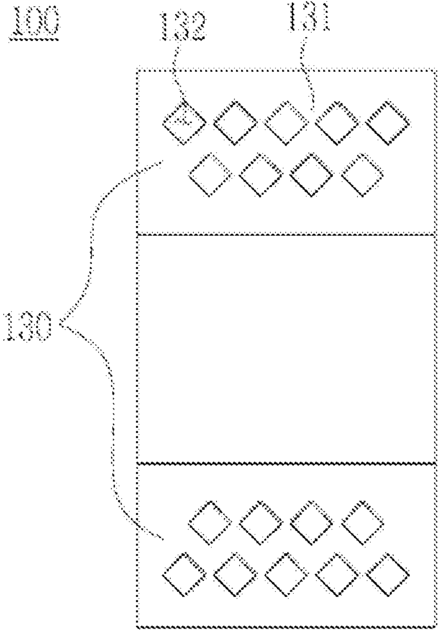
Figure 15:
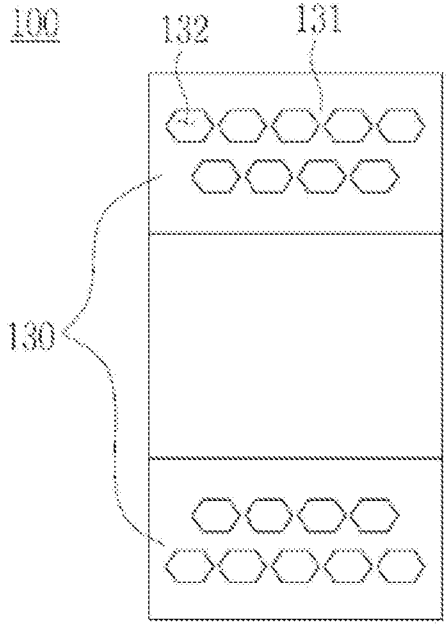

The shape of the window 132 may be circular or elliptical as illustrated in FIG. 12 or polygonal as illustrated in FIGS. 13 to 15. Also, the shape of the window 132 may be formed by appropriately combining the polygonal shape, the circular shape, and the elliptical shape as shown in FIG. 16 according to the flow and the direction of the first fluid.

To describe an additional modified example by referring to FIGS. 17 to 19, the window 132 may be formed in plural above and below the body portion 110 and may have a polygonal shape, a circular shape, an elliptical shape, or a combination of a portion of the polygonal shape, a portion of the oval shape, and a portion of the elliptical shape.

That is, the window 132 may be formed to have a shape in which a circular shape is split in half and the split halves are bonded to both sides of a diamond shape, as illustrated in FIG. 17. Alternatively, the window 132 may have a generally round triangular shape as illustrated in FIG. 18 or may have a shape in which an upper portion thereof has a circular shape and a lower portion thereof has a shape of a part of a hexagon.

As described above, the window 132 according to the present invention may not be limited to particular shapes and may include various shapes. Also, the upper portion and the lower portion of the window 132 may be different from each other. That is, the upper portion of the window 132 may have the circular elliptical shape of FIG. 14, and the lower portion of the window 132 may be formed such that a circular shape is split in half and the split halves are bonded to both sides of a diamond shape as illustrated in FIG. 17.

As described above, an embodiment of the present invention is described. However, it would be understood by one of ordinary skill in the art that the present invention may be variously corrected and changed by adding, changing, canceling, or further including an element within a scope not deviating from the concept of the present invention put forth in the claims and these modifications are also included in the scope of the present invention.

INDUSTRIAL APPLICABILITY

The present invention provides a hollow fiber membrane cartridge including a joint and a window, shapes of which are optimized to minimize damage to the hollow fiber membrane due to friction with the joint and the window.

The invention claimed is:

1. A hollow fiber membrane cartridge comprising:

a plurality of hollow fiber membranes; and a body portion in which the plurality of hollow fiber membranes are arranged, and above which and below which mesh portions are formed, respectively, wherein the mesh portion comprises a plurality of joints and a window formed to be surrounded by the plurality of joints, wherein the joint comprises:

a first surface facing an adjacent joint;

a second surface crossing the first surface and adjacent to the plurality of hollow fiber membranes;

an edge portion where the first surface and the second surface meet, and a radius of curvature of the edge portion is greater than zero times to five times the diameter of the hollow fiber membrane, wherein the joint has a first radius of curvature in a first direction parallel with an extension direction of the hollow fiber membrane and a second radius of curvature in a second direction crossing the first direction, the first radius of curvature and the second radius of curvature being different from each other.

2. The hollow fiber membrane cartridge of claim 1, wherein in the joint, a width of the first surface excluding the edge portion is greater than zero times to five times the diameter of the hollow fiber membrane.

3. The hollow fiber membrane cartridge of claim 1, wherein in the joint, a width of the second surface excluding the edge portion has is greater than zero times to ten times the diameter of the hollow fiber membrane.

4. The hollow fiber membrane cartridge of claim 1, wherein in the joint, at least one of a width of the first surface excluding the edge portion and a width of the second surface excluding the edge portion is 0.

5. The hollow fiber membrane cartridge of claim 1, further comprising a locking portion formed on a side surface of the body portion, wherein the locking portion comprises a locking cover formed to be connected to an end of the body portion, and a locking protrusion projecting from another end of the body portion.

6. The hollow fiber membrane cartridge of claim 1, wherein the window has a width that is twice to fifteen times the diameter of the hollow fiber membrane.

* * * * *